(12) United States Patent
Cannon et al.

(10) Patent No.: US 6,295,340 B1
(45) Date of Patent: *Sep. 25, 2001

(54) SPEECH CODING SELECTION BASED ON CALL RELATED INFORMATION (75) Inventors: Joseph M. Cannon, Harleysville; James A. Johanson, Emmaus; Vasu Iyengar, Allentown, all of PA (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/078,036

(22) Filed: May 13, 1998

(51) Int. Cl.[7] .................................................. H04M 1/64
(52) U.S. Cl. ..................... 379/88.1; 379/93.08; 379/127; 379/142; 379/88.21; 379/88.2
(58) Field of Search ............................... 379/88.1, 88.08, 379/88.09, 93.08, 127, 142, 88.07, 88.19, 88.2, 88.21

(56) References Cited

U.S. PATENT DOCUMENTS

| | | | |
|---|---|---|---|
| 4,582,956 | 4/1986 | Doughty | 379/93.14 |
| 5,506,872 * | 4/1996 | Mohler | 375/240 |
| 5,524,140 | 6/1996 | Klausner et al. | 379/88.11 |
| 5,881,104 * | 3/1999 | Akahane | 375/240 |
| 5,978,757 * | 11/1999 | Newton | 704/217 |
| 6,026,152 * | 2/2000 | Cannon et al. | 379/142 |
| 6,067,349 * | 5/2000 | Suder et al. | 379/88.19 |

* cited by examiner

Primary Examiner—Fan Tsang
Assistant Examiner—Ovidio Escalante
(74) Attorney, Agent, or Firm—William H. Bollman (57) ABSTRACT

A variable voice compression device and method in a voice messaging system is provided. The device includes a call related information/coding table or database which contains associations between call related information regarding desired calling parties, and selected coding techniques and effective data rates resulting in varying voice compression ratios. Upon receipt of an incoming call, call related information sent from the central office is compared to entries in the call related information/coding table or database. If a match is found, the subsequent voice message is encoded with a coding technique and effective data rate determined from the matching entry in the call related information/coding table or database. Otherwise, the voice message is encoded with a default coding technique and effective data rate.

22 Claims, 7 Drawing Sheets

| CALL RELATED INFORMATION | STORAGE QUALITY | EFFECTIVE DATA RATE |
|---|---|---|
| JOHN DOE | 3 | 8 Kbls |
| 880-555-2000 | 3 | 8 Kbls |
| MOM SMITH | 5 | 16 Kbls |
| GRANDMA SMITH | 5 | 16 Kbls |
| DEFAULT | 1 | 5.8 Kbls |

FIG. 2B

| CALL RELATED INFORMATION | STORAGE QUALITY | CODING TECHNIQUE |
|---|---|---|
| JOHN DOE | 3 | ADPCM |
| 880-555-2000 | 3 | ADPCM |
| MOM SMITH | 5 | ADPCM |
| GRANDMA SMITH | 5 | ADPCM |
| DEFAULT | 1 | CELP |

SPEECH CODING SELECTION BASED ON CALL RELATED INFORMATION

BACKGROUND OF THE INVENTION

1. Field of the Invention

The present invention relates to voice messaging systems. More particularly, it relates to voice messaging systems wherein the speech coding used to code incoming voice messages is changeable based on incoming call related information.

2. Description of Related Art

Voice messaging has become an everyday requirement in today's society. Early voice messaging apparatus comprised magnetic cassette tapes which recorded a significant amount of voice messages, e.g., 60 minutes of voice messages. However, cassette tapes were disadvantageous because of the mechanics and time required to fast-forward and rewind the cassette tapes to the storage points of individual messages.

More recently, particularly as the size of memory has increased in density while at the same time decreased in price, digital voice messaging systems have become commonplace. Digital voice messaging systems store incoming voice messages in digital memory, reducing the mechanics and cost, and increasing the reliability over conventional analog voice messaging systems.

It is commonly known to encode voice messages for storage in digital voice messaging systems to maximize the length of voice messages which may be stored in a finite amount of memory. Various conventional voice compression techniques exist, many having various effective data rates. For instance, linear predictive coding (LPC), code-excited linear predictive (CELP) coding, RPE-LTP, or adaptive differential pulse code modulation (ADPCM) are examples of techniques, any one of which may be utilized by conventional digital voice messaging systems, and any one of which may be implemented at varying effective data rates. These coding techniques result in a compression of the data yielding a reduction in the data rate necessary to represent the underlying voice message. The effective data rate resulting from a general linear approach to digitizing toll quality speech (e.g., 8 KHz, 8-bit sampling, i.e., 64 Kb/s) with respect to an effective data rate resulting from a coding technique such as CELP, LPC, or ADPCM forms a compression ratio of the coding. These compression techniques have been developed for use with digital voice messaging systems which in general reduce the number of bits necessary to represent voice message data. Although it is recognized that the compression techniques are improved over time to better approach toll quality speech, in general the greater the compression ratio, the greater the degradation in the quality of the speech stored in voice memory. "Compression ratio" as used herein refers to the ratio of the number of bits representing the voice message in linear form divided by the number of bits used to represent the same voice message in compressed or coded form.

Figure 6:
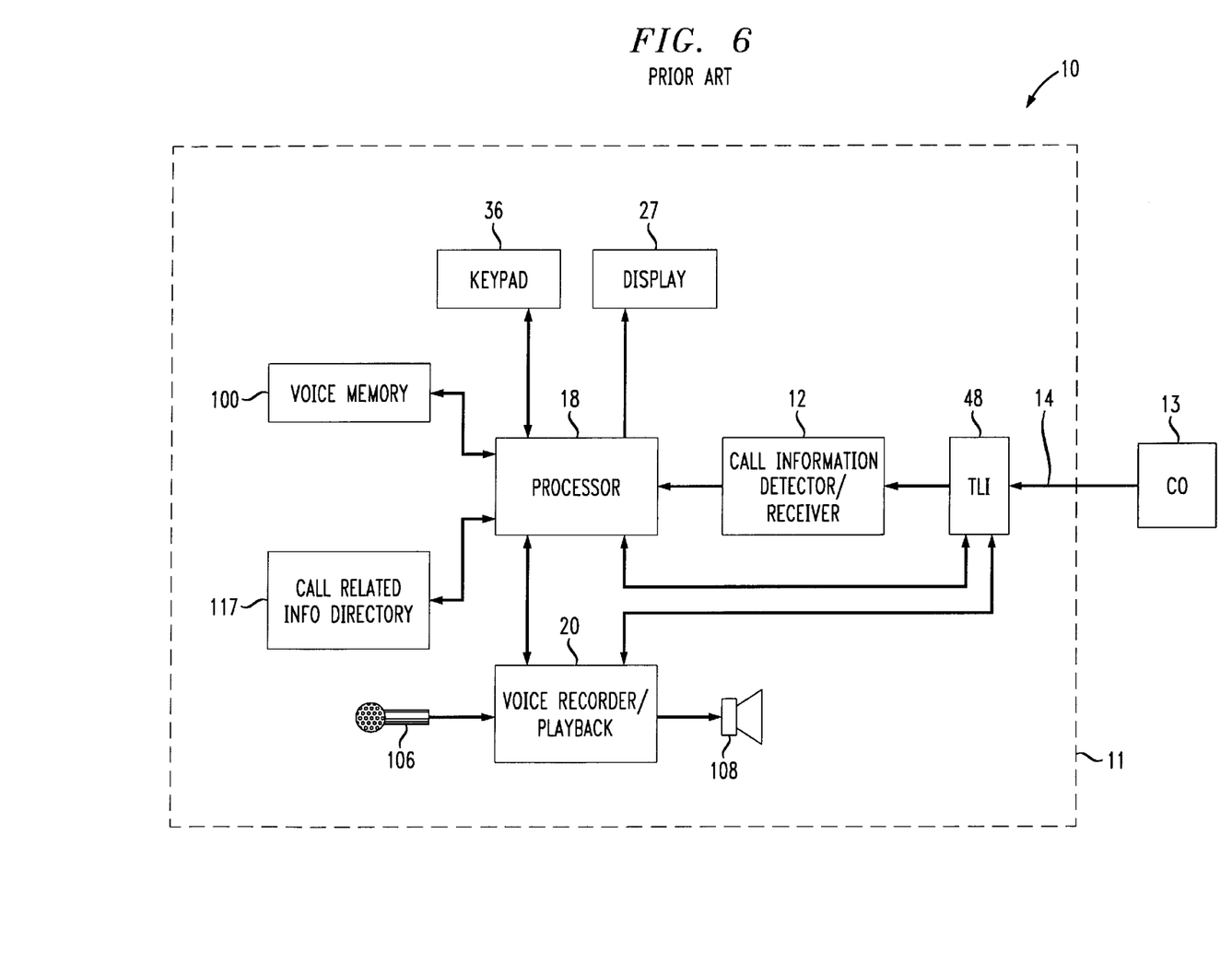
FIG. 6 shows a conventional TAD.

FIG. 6 shows a prior art voice messaging apparatus such as a digital telephone answering device (TAD) 11. Although described with respect to embodiments relating to a TAD, the present invention is equally applicable to a voice mail type system and voice messaging systems in general.

In FIG. 6, a signal from a microphone or other analog signal source 106 is input to a codec, analog-to-digital converter, or other digitizing device in a voice recorder/playback module 20 for conversion to m-law or A-law pulse code modulated (PCM) data. The m-law or A-law PCM data is encoded and compressed by a variable compression ratio encoding routine in the processor 18. For playback, a variable compression ratio decoding routing in the processor 18 together with a codec, digital-to-analog converter, or similar device in the voice recorder/playback module 20 converts voice message data retrieved from voice memory into an analog signal for output to speaker 108.

While control of the TAD 11 and handling of voice processing is shown in FIG. 6 as being handled in processor 18, a separate digital signal processor may be utilized to handle the compression and other voice processing tasks. The processor 18 controls the encoding and decoding tasks performing the compression and decompression of the voice message data. Processor 18 also controls storage of the compressed (encoded) speech data into voice memory 100, and controls the retrieval of compressed speech data from the voice memory 100.

The TAD 11 further includes an alpha-numeric keypad 36 and display 27 as are known in the art. The display 27 displays call related information regarding an incoming call, e.g., a caller's telephone number and household name, received from a central office 13 via a telephone line interface 48 and call related information detector/receiver 12.

However, conventional voice messaging systems are limited by the compression rate used and the amount of available message memory. Messages which are received after the memory becomes full, such as after a long vacation, are conventionally refused.

Thus, there is a need to maximize the available message memory for use beyond that which is conventionally available such that more messages may be stored.

SUMMARY OF THE INVENTION

In accordance with the principles of the present invention, a variable voice compression ratio device in a voice messaging device comprises a processor, a call related information detector/receiver, and a call related information/coding database to associate pre-set call related information with one of a plurality of voice compression ratios. The processor compares incoming call related information to the pre-set call related information to determine the desired voice compression ratio for storage of a voice message corresponding to the incoming call.

In another aspect of the invention, a variable voice compression ratio device comprises a memory containing a plurality of voice compression ratio values each associated with respective call related information. A call related information receiver receives incoming call related information, and a processor compares the received call related information with the respective call related information contained in the memory to identify one of the plurality of voice compression ratio values.

A method of setting an effective data rate for storage of a voice message for an incoming call in accordance with the present invention provides detection and reception of call related information relating to the incoming call. The detected and received call related information is compared with a memory containing pre-set call related information associated with respective effective data rates. An effective data rate is then set for storage of the voice message of the incoming call based on the comparison.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention relates to a voice messaging system such as a telephone answering device or voice mail system which utilizes differing coding processes and/or data rates resulting in varying compression ratios based on a database relating call related information of the incoming call to particular ones of the differing coding processes and/or data rates. Thus, the coding technique and compression ratio are adjusted based on call related information associated with an incoming call received by the voice messaging system.

The disclosed embodiments relate to a digital telephone answering device (TAD) in particular, but the principles disclosed herein are equally applicable to voice mailbox type systems and voice messaging systems in general. Moreover, while the disclosed embodiments describe the reception of Caller ID information as an example of call related information, the invention relates to the reception and processing of any call related information.

Many telephone companies offer a special service which transmits call related information to a called party before the call is answered. One such service is commonly referred to as caller identity deliver, or "Caller ID". Using Caller ID, typically a caller's telephone number and/or household name is transmitted by the telephone company to the called party generally during the silent interval between the first two rings. More sophisticated systems transmit call related information while a party is off-hook, e.g., Caller ID/Call Waiting (CIDCW). Caller ID systems which receive caller ID information from incoming calls are known.

Figure 1:
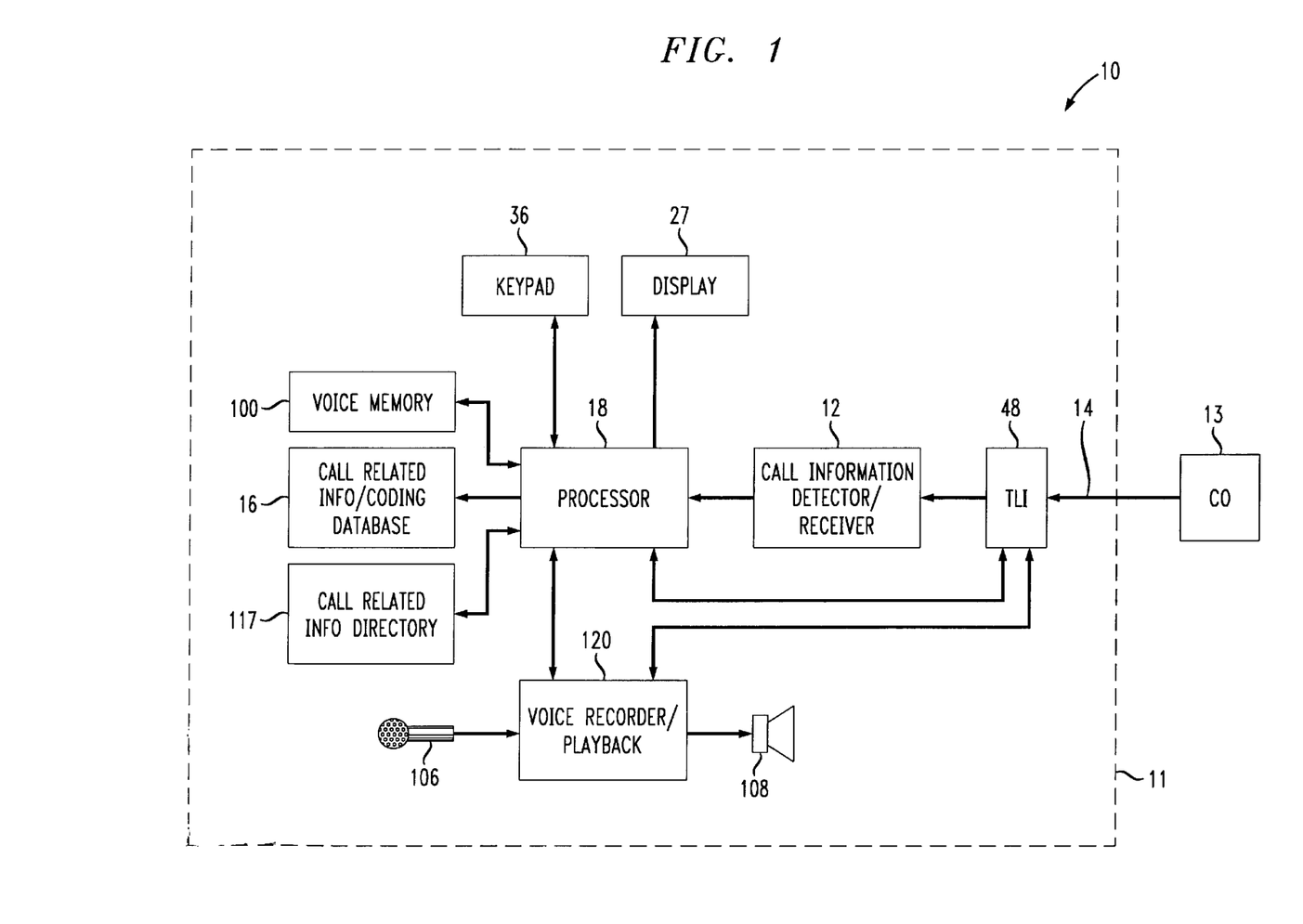
FIG. 1 is a block diagram of a telephone answering device (TAD) in accordance with the principles of the present invention.

FIG. 1 shows a TAD 11 including reception of call related information, e.g., Caller ID, in accordance with the principles of the present invention. The present invention utilizes the Caller ID information to determine a pre-set coding technique and effective data rate corresponding to a particular compression ratio to be utilized to encode the subsequent voice message.

In FIG. 1, the TAD 11 includes a call information detector and receiver 12 which decodes call related information (e.g., Caller ID information) regarding the calling party. Current Caller ID services provide the telephone number and/or household name of a calling party before the calling party is answered. The call related information is transmitted by the central office 13 over a telephone line 14 and is received by the call related information detector/receiver 12 generally during the silent interval between the first and second ring (or before the first ring in other countries, e.g., in the United Kingdom). The call related information is stored in a conventional call related information directory 117 by processor 18. The processor 18 may be any suitable microprocessor, microcontroller, or digital signal processor (DSP), or even a combination of multiple processors such as a microcontroller and a DSP.

The TAD 11 also includes a suitable voice recorder/playback module 120 connected to a standard microphone 106 and a standard speaker 108. The voice recorder/playback module 120 handles the outgoing pre-recorded greeting message in conjunction with the processor 18, as well as the playback of voice messages.

The TAD 11 further includes a dual tone, multiple frequency (DTMF) decoder and a DTMF generator within processor 18 for controlling the voice recorder/playback module 120. Thus, the contents of the call related information/coding table or database 16 and other features of the TAD 11 may be programmed remotely using DTMF tones which are decoded into control signals by the processor 18.

The TAD 11 inventively further includes a call related information/coding table or database 16 either in random access memory (RAM) or in re-writable read only memory (ROM) such as electrically erasable programmable read only memory (EEPROM) or flash memory. The call related information/coding database 16 contains manually entered information relating call related information to a voice storage quality parameter corresponding to various coding techniques and/or effective data rates corresponding to a variety of available compression ratios. The call related information is entered using keypad 36 and display 27. The voice storage quality parameters may be any number or other reference to a particular coding technique or effective data rate to be invoked for compression and storage of the incoming voice message.

As an example, five voice storage quality parameters may be defined, e.g., 1 (lowest quality) to 5 (highest quality). Of course, more or less variation in the possible choices of encoding techniques and/or effective data rates will respectively provide more or fewer possible choices for the user to select from. Moreover, more or fewer numbers of voice storage quality parameters may be utilized, depending upon the particular application.

The various voice storage quality parameters may correspond to one coding technique, e.g., CELP, but to various frame lengths corresponding to various effective data rates, or it may correspond to multiple types of coding techniques having differing effective data rates, or a mix of both. For example, three CELP voice storage quality parameters may be provided corresponding to a 10 millisecond (mS) frame duration, 20 mS frame duration, and 25 mS frame duration CELP coding process, respectively. The voice storage parameter may alternatively or additionally refer to pre- and post-processing techniques such as interpolation or decimation. The particular coding technique, and frame duration or other information relating to effective data rate, are invoked in the processor 18 based on a selected or default voice storage quality parameter. The voice message is stored in voice message memory 100 after processing by the invoked coding technique and/or effective data rate. If a codebook is employed, a different number of indices may be used to achieve various compression rates. Moreover, different levels of LPC parameters and/or quantization, etc. may be used to achieve various compression rates.

Voice message memory 100 may be any suitable re-writable memory such as random access memory (RAM), electrically erasable programmable read only memory (EEPROM), or flash memory. Non-volatile memory such as flash memory or EEPROM are preferred to prevent loss of stored messages in the event of power failure to the TAD 11.

Each of the voice messages are stored in the voice memory 100 together with conventional header information. Additionally, the header stored with each voice message includes the type of coding process/effective data rate used to encode the voice message. Optionally, the header information may include the voice storage quality parameter which is mapped into a particular coding process/effective data rate in a table accessed by the processor 18.

Upon decoding, the processor 18 invokes the complementary decoding and decompression routines corresponding to the coding technique and effective data rate used to encode the voice message, as determined by the content of the header information stored with the particular voice message.

Any portion or all of the incoming call related information may be used either as an entry in the call related information/coding database 16 or for use in comparison of the incoming call related information. For instance, information which may be utilized for comparison and/or entry in the call related information/coding database 16 includes the area code of the incoming telephone, the last name of the household, the full telephone number, and/or the full household name.

Figure 2A:
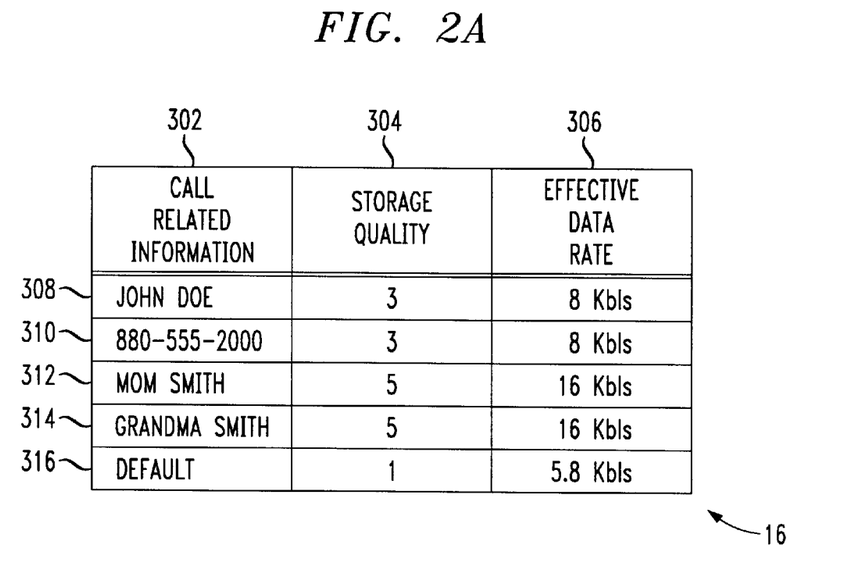
FIG. 2A shows the contents of an exemplary embodiment of the call related information/coding database in FIG. 1.

FIG. 2A shows the contents of an exemplary embodiment of the call related information/coding table or database 16 shown in FIG. 1. In FIG. 2A, call related information entries 302 are related to selected voice storage parameters (i.e., storage quality) 304, and mapped to effective data rates 306 of coding techniques operable by processor 18. The exemplary call related information/coding table or database 16 includes five manually entered records 308–316.

The first record 308 indicates that if "JOHN DOE" calls, as determined by a comparison of household name of incoming call related information to the first record 308, then processor 18 is to invoke the coding process and effective data rate corresponding to a desired compression ratio in the processor 18 as corresponding to a voice quality storage parameter of "3".

The second record 310 indicates that the processor 18 is to invoke the same coding process and effective data rate as with respect to the first record 308, if a voice message is received from the telephone number "880-555-2000".

The second and third records 312, 314 indicate that the highest quality coding process having the highest effective data rate corresponding to the lowest compression ratio provided by the TAD 11 is to be invoked by the processor 18 if "MOM SMITH" or "GRANDMA SMITH" call.

All other incoming calls to the TAD 11, including those without call related information sent from the central office 13, are to utilize the default setting for encoding the voice message, which in record 316 is set to the lowest quality, i.e., highest compression ratio corresponding to a voice storage quality parameter of "1".

Figure 2B:
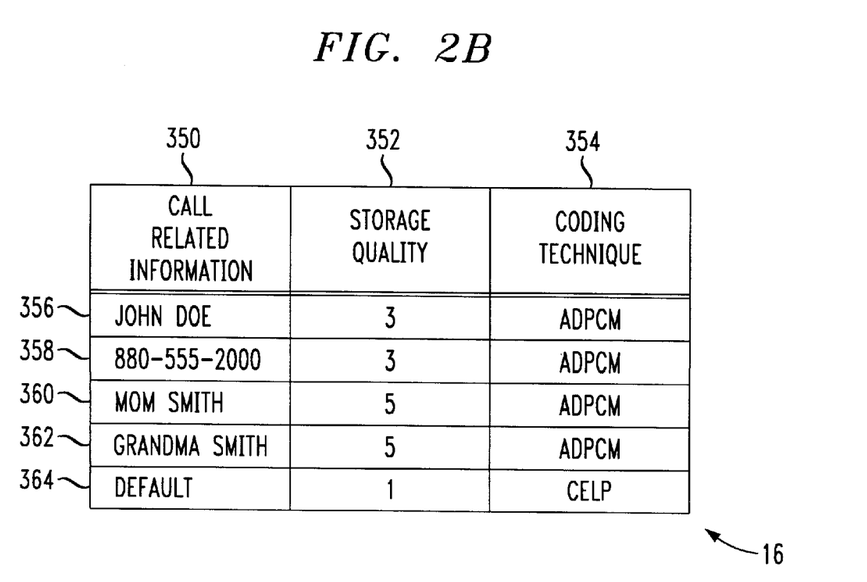
FIG. 2B shows the contents of another exemplary embodiment of the call related information/coding database in FIG. 1.

FIG. 2B shows the contents of another exemplary embodiment of the call related information/coding table or database in FIG. 1. The call related information/coding table or database 16 is similar to that shown in FIG. 2A, but maps a particular coding process in column 354 to the call related information entries 350 and voice storage quality parameter entries 352 of individual records 356–364. FIGS. 2A and 2B demonstrate that any aspect of the particular coding process representing a differing effective data rate may be used to correlate a desired priority level (i.e., voice storage quality parameter), to the possible voice coding and compression capabilities of the TAD 11.

Figure 3A:
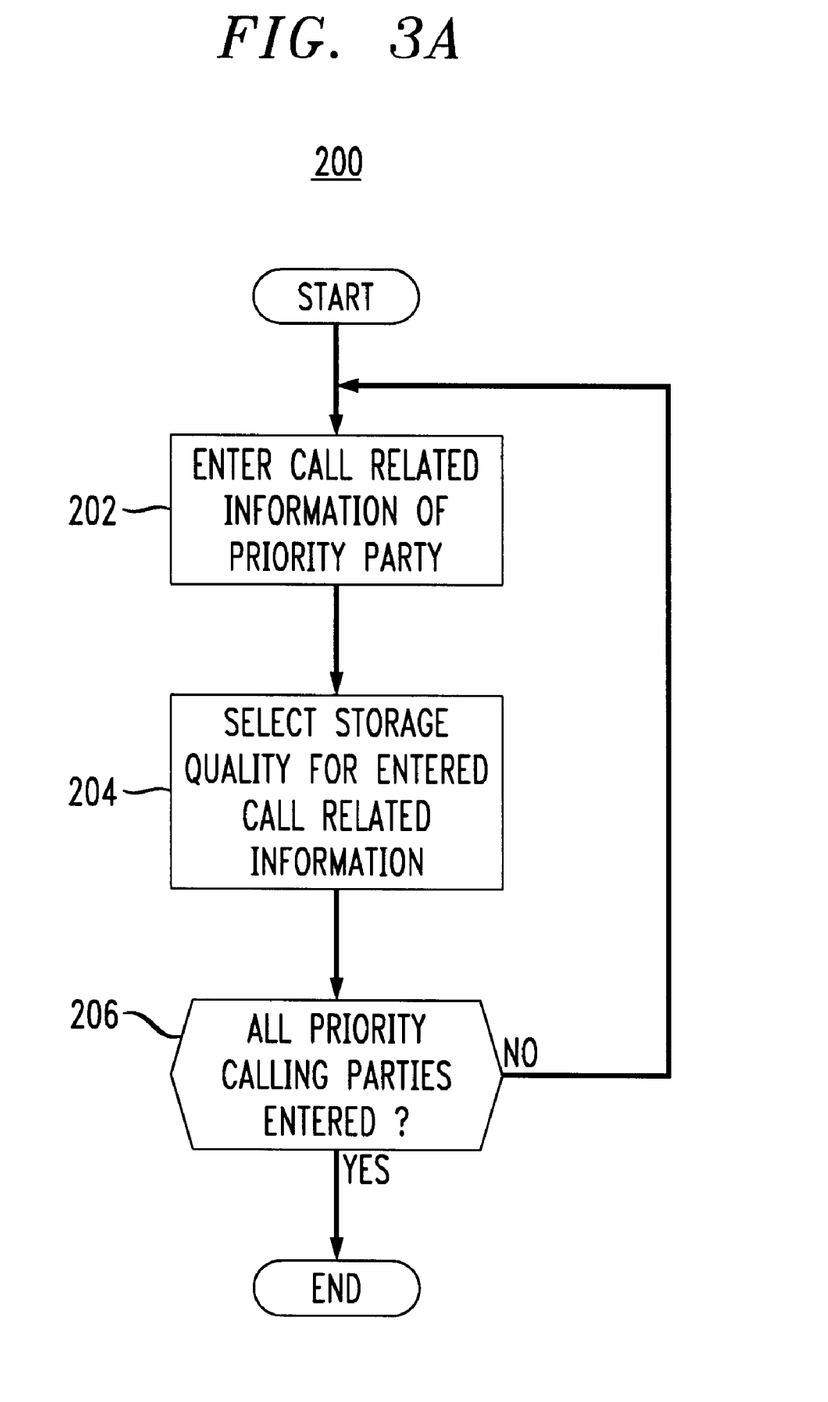
FIG. 3A shows a flow chart of selecting a desired coding technique/effective data rate for each of a plurality of priority parties.

FIG. 3A shows a flow chart for manually inputting call related information regarding desired priority parties into the call related information/coding table or database 16 of the TAD 11, and for initially selecting the desired voice storage quality parameters for those callers from among those available in the TAD 11. Alternatively, or in addition, the call related information may be input in conjunction with another feature or function of the TAD 11. For instance, the call related information may be gleaned from speed dial information input into the TAD 11 together with a prompt to the user as to the coding level and/or quality of the stored voice messages received from that particular caller.

In particular, the first step of the process shown in FIG. 3A prompts a user on the display 27 (FIG. 1) to enter via the keypad 36 (FIG. 1) call related information identifying a first party for which to preset a voice storage quality parameter. The process then prompts the user to select the desired voice storage quality parameter for that first entered priority party, e.g., either "1", "2", "3", "4", or "5". While the present embodiment is described with respect to five coding techniques and/or effective data rates, it is to be understood by those of skill in the art that virtually any number of levels of voice storage quality may be possible. For example, only two selections may be made available, e.g., "high" and "low". Alternatively, the frame duration may be made adjustable in the coding technique to allow selection of 1 to 99 mS frame durations corresponding to a storage quality selection of "1" to "99".

In step 206, the entry process prompts the user for the entry of any additional priority parties. If the user desires to enter additional entries in the call related information/coding table or database 16, then the process returns to step 202 for entry of call related information of the next priority party. If, on the other hand, there are currently no additional priority parties to enter in the call related information/coding database 16, then the process 200 shown in FIG. 3A ends.

Entries in the call related information/coding table or database 16 may be amended and/or appended to by the user at any time. For instance, additional entries may be appended to the end of the table or database contained in the call related information/coding table or database 16. Moreover, previously entered records in the call related information/coding table or database 16 may be overwritten as desired.

Figure 3B:
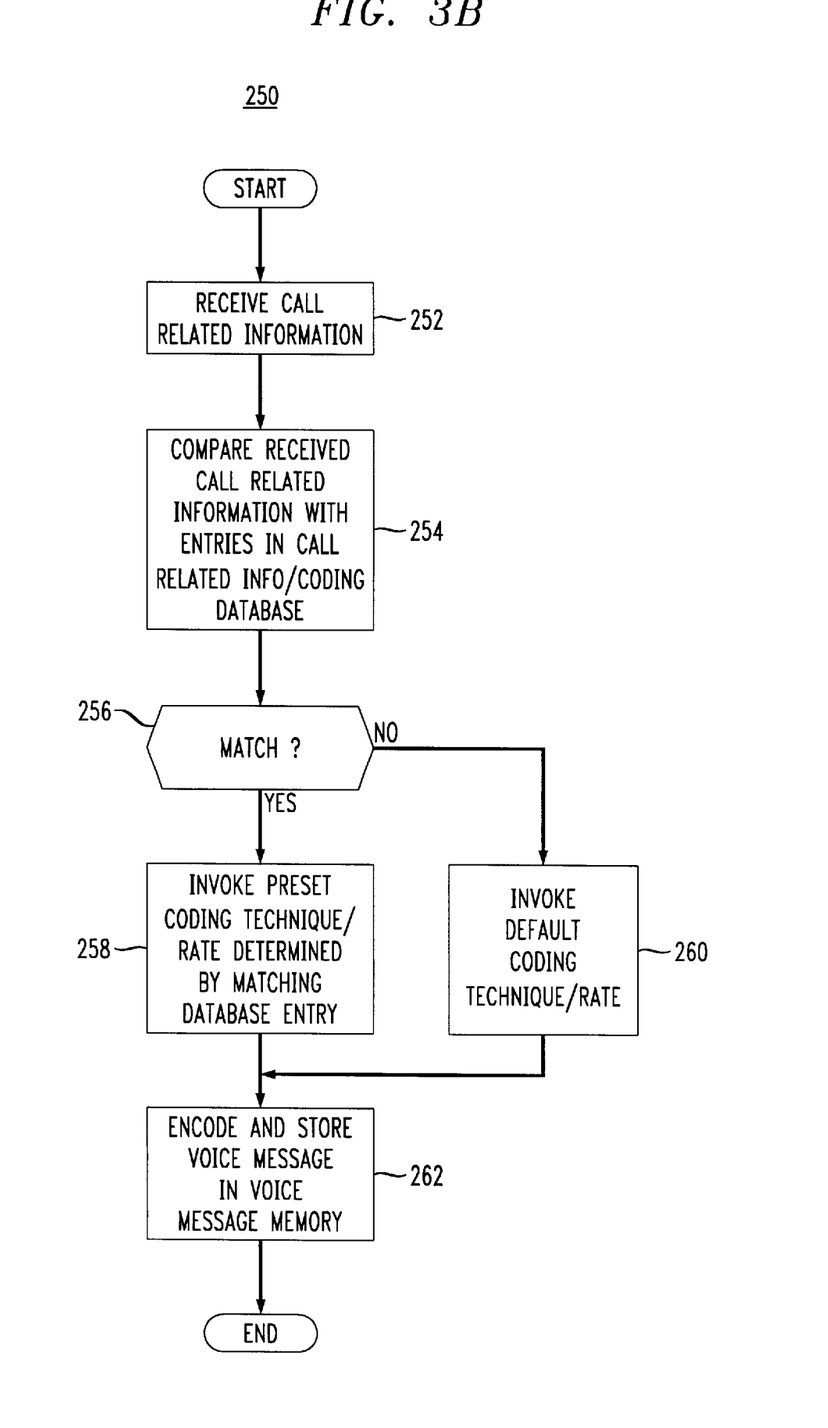
FIG. 3B shows a flow chart invoking one of a plurality of coding techniques/effective data rates in accordance with an embodiment of the present invention.

FIG. 3B shows a flow chart of the inventive operation of the TAD 11, i.e., a comparison and invoking of a designated coding process and effective data rate performed by processor 18.

In particular, the first step 252 of the process 250 shown in FIG. 3B receives call related information from an incoming call. The received call related information is compared in step 254 with records in the call related information/coding table or database 16 (FIG. 1). If a match is determined in step 256 as between any portion of the received incoming call related information and an entry in the call related information portion of the call related information/coding table or database 16, then a preset coding process and effective data rate is invoked for voice processing of the received voice message in step 258. If there is no match, then the default coding process and effective data rate is invoked in step 260.

The default coding process and effective data rate is shown as an additional record in the call related information/ coding database 16, but may alternatively be a manual switch setting on the TAD 11.

In step 262, the incoming voice message is encoded by the designated coding process at the designated effective data rate, and stored in voice message memory 100. After storage of the voice message, the TAD 11 returns to an idle state to await another call, playback of stored voice messages, etc.

The principles of the present invention may be invoked upon the occurrence of a predetermined event, e.g., upon the voice message memory 100 becoming near full, e.g., 90% full. In this event, the processor can then compress each subsequent message based on the associated call related information. Alternatively, to free up some space in the voice message memory 100, the processor may initially store all messages at a default compression rate. Then, as the memory becomes full, review and recompress all stored messages based on associated call related information and the desired or default compression rate set in the call related information/coding table or database 16.

Moreover, the call related information/coding table database 16 can be expanded to include a plurality of compression levels to associate with the various call related information. In this case, the various levels could be associated with, e.g., various levels of usage of the voice message memory. Thus, as the voice message memory fills, higher compression ratios can be used for the various messages based on the information contained in the call related information/coding table or database 16. This feature would help preserve as many voice messages as possible as the memory fills up.

Figure 4:
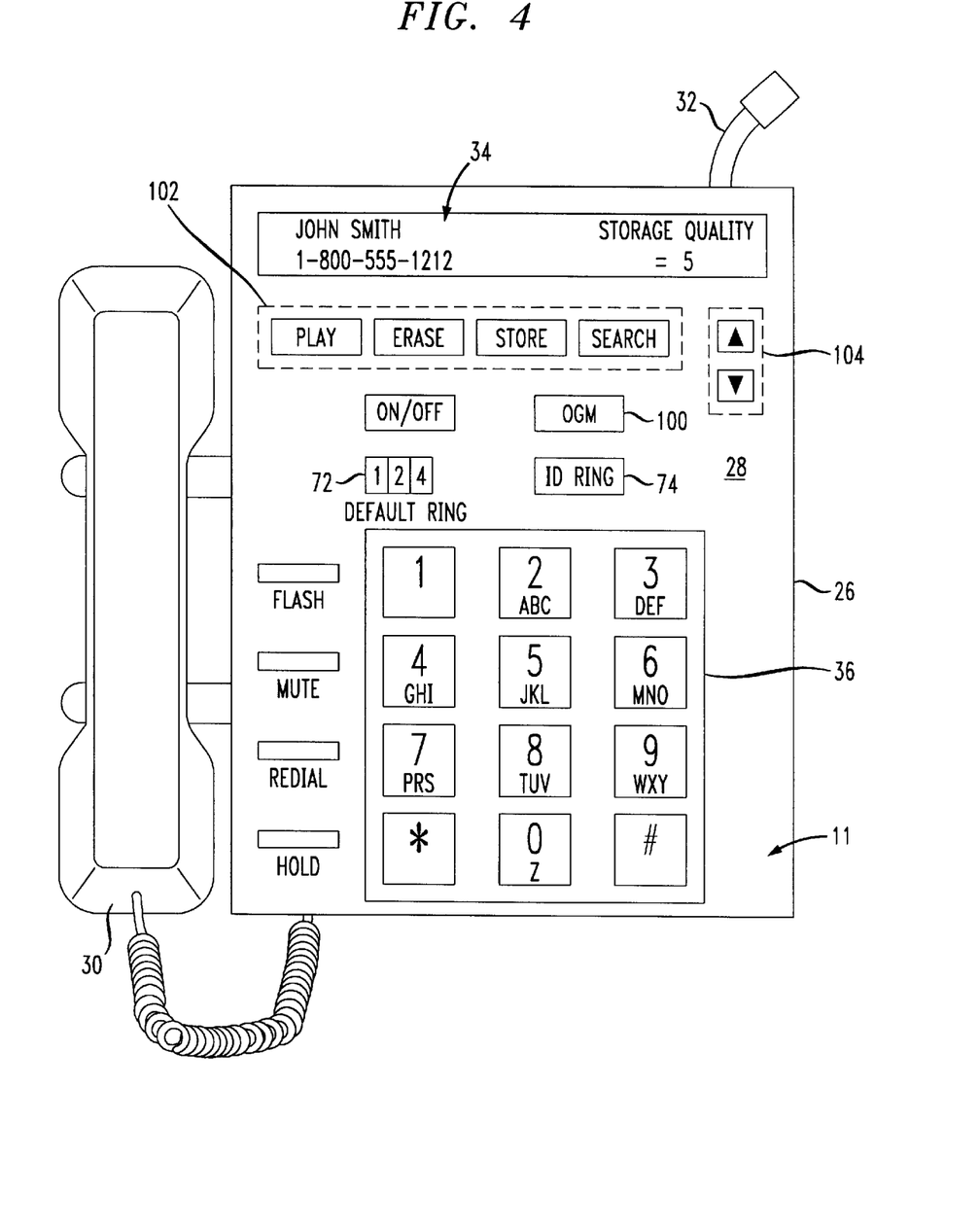
FIG. 4 is a front view of a TAD in accordance with the principles of the present invention.

The display 27 (FIG. 1) displays call related information about an incoming call, as well as the designated (or default) voice storage quality parameter or other information associated with that incoming call, as shown in FIG. 4.

In more detail, FIG. 4 shows the TAD 11 packaged to fit within a console 26. The console 26 may be equipped with a standard handset 30 and a standard modular telephone jack 32, e.g., an RJ-11 connector. A control panel 28 includes a liquid crystal display (LCD) forming display 27, and the alpha-numeric keypad 36. As noted above, the display 27 shows the call related information, i.e., the incoming telephone number and/or the household name associated with the incoming telephone number. The display 27 is also used during entry of the records in the call related information/coding table or database 16 for prompts to the user, and for showing entered information. The TAD 11 otherwise includes conventional features such as a control button 100 for recording or playback of an outgoing greeting message, playback and record manual controls 102, and call related information log scrolling controls 104 for scrolling a display of the conventional call related information contained in the call related information directory 117.

Figure 5:
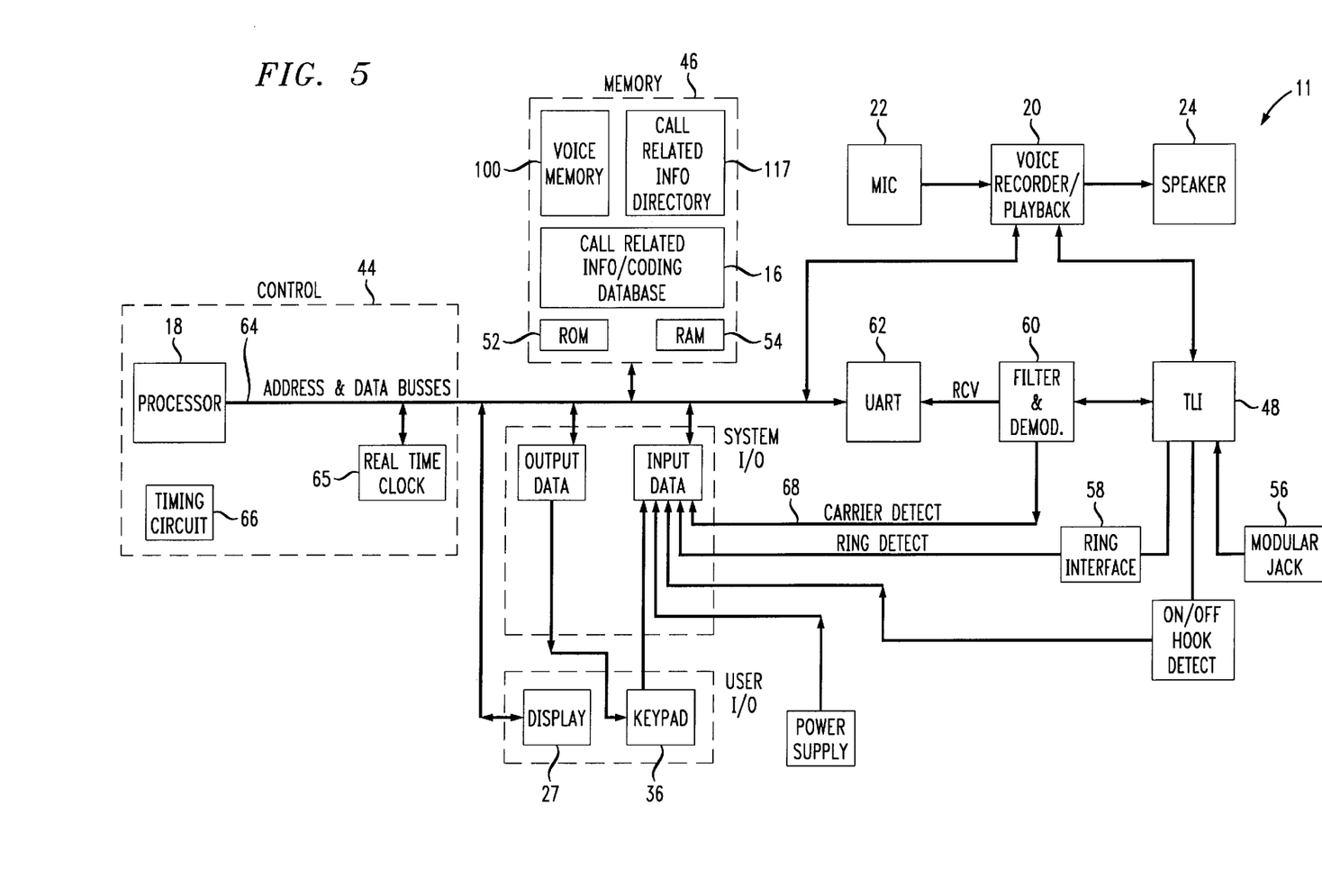
FIG. 5 is a more detailed block diagram of the TAD shown in FIG. 1.

FIG. 5 shows a detailed circuit diagram of a TAD 11 provided in accordance with the principles of the present invention. The TAD 11 includes a control circuit 44, memory block 46 and a telephone line interface (TLI) circuit 48. Control circuit 44 includes processor 18 which controls the system by executing instructions that are stored in memory 46. Memory block 46 includes programmable read-only memory (ROM) 52 for storing program code. The call related information/coding table or directory 16 is stored in flash memory in memory block 46. Random access memory (RAM) 54 is also provided for general use and to store log data for call related information, voice message data, and the like.

The telephone line interface circuit 48 includes circuitry which permits the TAD 11 to be connected directly to a standard modular telephone jack 32, e.g., an RJ-11 connector. The telephone line interface circuit 48 also includes various control and monitoring circuits that are common to ordinary customer premises equipment. These circuits may include circuitry to interface the telephone handset 30, a ring detect interface circuit 58 provides a signal indicative of a ring signal of the incoming calls to the processor 18, and an on/off hook detect circuit 70. In the illustrated embodiment, the telephone line interface circuit 48 also includes an isolated filter and demodulating circuit 60 to demodulate an incoming serial data stream. A universal asynchronous receiver/transmitter (UART) 62 is used to convert the demodulated serial data received from the filter and demodulating circuit 60 to a parallel format read by the processor 18 via address and data busses 64. Alternatively, the processor 18 can perform the UART function.

In the illustrated embodiment, data received by the filter and demodulating circuit 60 includes call related information, e.g., Caller ID data representing the telephone number of the incoming call. Data corresponding to the household name associated with the incoming call may also be received by the filter and demodulating circuit 60. The protocol and other features relating to the otherwise conventional features of the circuit shown in FIG. 3 are known, e.g., as described in U.S. Pat. No. 4,582,956, the disclosure of which is hereby incorporated by reference into the present specification.

Frequency shift keying, phase shift keying, amplitude modulations, quadrature amplitude modulation or any other suitable modulation technique may be used for transmitting the incoming serial data stream containing the call related information to the TAD 11.

A real time clock circuit 65 and a system timing circuit 66 may also be provided to provide timing for the TAD 11. The real time clock circuit 65 provides the system with the current time and date for time and date stamping received voice messages, while the system timing circuit 66 is used for instruction cycle timing of the processor 18.

In the illustrated embodiment, when a caller initiates a call to the TAD 11, its call related information is transmitted by the central office 13 and received by the telephone number detector/receiver 12 (FIG. 1), e.g., during the silent period between the first and second rings. If the received call related information does not match any call related information pre-programmed in the call related information/coding table or database 16, then the TAD 11 invokes the default coding technique and effective data rate for voice processing of a voice message from that caller.

Voice signals are transmitted to and from the telephone line through the RJ11 connector 32 and pass through the telephone line interface circuit 48 to the voice recorder/playback circuit 120. The subsequent incoming voice message signal is digitized and compressed by the selected coding technique and/or effective data rate for efficient storage by the processor 18. The incoming voice messages are linked with call related information received with respect to that incoming call, and may be retrieved by the user through the voice recorder/playback circuit 120.

The processor 18 also controls the functioning of the voice/playback circuit 20 through controls such as PLAY, RECORD, FAST FORWARD, REWIND, ERASE and STOP signals (FIG. 2).

A TAD in accordance with the principles of the present invention may also operate in a remote message playback and DTMF detection mode. In this mode, the user listens to a pre-recorded announcing message at a remote telephone.

The incoming call from the user is answered by the TAD as described above. At any time during the outgoing announcing message, the user may key-in predefined user ID information using a DTMF keypad generating DTMF tones indicating that the user wishes to listen to stored voice messages. The voice recorder/playback circuit 120 detects the presence of the DTMF tones and converts them into control information for the processor 18. The DTMF tones form a control signal which the processor 18 responds to by either playing back a recorded voice message or by deleting a recorded voice message. As noted above, DTMF tones may also be used to program the information in the call related information/coding table or database 16 remotely.

Although an embodiment of a voice messaging system in accordance with the principles of the present invention has been described as a stand-alone device, the voice messaging system may be in the form of a circuit card which is installed within a larger device such as a personal computer (PC) or private branch exchange (PBX).

It can be appreciated that the equipment and method of the invention improves upon the traditional voice messaging system by enabling the call itself to automatically select and invoke the coding technique and/or effective data rate corresponding to a data compression for recording of the voice message.

Voice messaging systems in accordance with the principles of the present invention prevent waste of voice memory on undesirable memory, provide relatively more voice memory to calls from chosen sources, and store voice messages from important calls at a higher voice quality than other, less important voice messages.

While the invention has been described with reference to the exemplary preferred embodiments thereof, those skilled in the art will be able to make various modifications to the described embodiments of the invention without departing form the true spirit and scope of the invention.

What is claimed is:

1. A variable voice compression ratio device in a voice messaging device, said variable voice compression ratio device comprising:
    a processor; and
    a call related information/coding database, said call related information/coding database associating call related information pre-set by a user with a respective one of a plurality of voice compression ratios;
    said processor being operable for an incoming call to compare call related information provided by a central office of a telephone company for said incoming call to said pre-set call related information in said call related information/coding database, and to determine one of said plurality of voice compression ratios for storage of a voice message corresponding to said incoming call based on said comparison.

2. The variable voice compression ratio device according to claim 1, wherein:
    said processor determines said one of said plurality of voice compression ratios for said incoming call while said voice messaging device is in an on-hook condition with respect to said incoming call.

3. The variable voice compression ratio device according to claim 1, wherein:
    said call related information is at least a portion of a telephone number.

4. The variable voice compression ratio device according to claim 1, wherein:
    said call related information is Caller ID information.

5. The variable voice compression ratio device according to claim 1, further comprising:
    a display connected to said processor.

6. The variable voice compression ratio device according to claim 5, wherein:
    said display is adapted and arranged to display said call related information for said incoming call.

7. The variable voice compression ratio device according to claim 5, wherein:
    said display is adapted and arranged to display an indication of a designated one of said plurality of voice compression ratios for said incoming call.

8. The variable voice compression ratio device according to claim 5, wherein:
    said display is adapted and arranged to indicate that a default voice compression ratio is associated with said incoming call.

9. The variable voice compression ratio device according to claim 1, wherein:
    said call related information/coding database contains information associated with a speed dial function.

10. A variable voice compression ratio device comprising:
    a memory adapted and arranged by a user to contain a plurality of voice compression ratio values each associated with respective call related information;
    a call related information receiver to receive call related information provided by a central office of a telephone company with respect to an incoming call; and
    a processor to compare said received call related information with said respective call related information contained in said memory to identify one of said plurality of voice compression ratio values.

11. The variable voice compression ratio device according to claim 10, wherein:
    said call related information is at least a portion of a telephone number of said incoming call.

12. The variable voice compression ratio device according to claim 11, wherein:
    said portion of said telephone number is an area code.

13. The variable voice compression ratio device according to claim 10, wherein:
    said call related information is a household name associated with said incoming call.

14. The variable voice compression ratio device according to claim 10, wherein said processor comprises:
    a digital signal processor.

15. The variable voice compression ratio device according to claim 10, further comprising:
    an alpha-numeric keypad in communication with said processor to input said plurality of voice compression ratio values and said respective call related information into said memory.

16. A method of setting an effective data rate for storage of a voice message for an incoming call, said method comprising:
    detecting and receiving call related information provided by a central office of a telephone company relating to said incoming call;
    comparing said detected and received call related information with a memory containing call related information pre-set by a user associated with respective ones of a plurality of effective data rates; and
    setting said effective data rate for storage of said voice message of said incoming call based on said comparison.

17. The method of setting said effective data rate for storage of a voice message according to claim 16, wherein:

said call related information is at least a portion of a telephone number of said incoming call.

18. The method of setting said effective data rate for storage of a voice message according to claim 17, wherein:

said portion of said call related information is an area code.

19. The method of setting said effective data rate for storage of a voice message according to claim 16, wherein:

said call related information is a household name associated with said incoming call.

20. A variable voice compression ratio device comprising:

a processor;

call related information detector/receiver means for detecting and receiving call related information provided by a central office of a telephone company about an incoming call; and call related information memory means for associating call related information pre-set by a user with a corresponding one of a plurality of voice compression ratios;

said processor being operable for an incoming call to compare call related information for said incoming call to said pre-set call related information in said call related information memory means, and to determine a voice compression ratio for storage of a voice message corresponding to said incoming call based on said comparison.

21. The variable voice compression ratio device according to claim 20, wherein:

said processor determines said corresponding one of said plurality of voice compression ratios while a voice messaging system including said variable voice compression ratio device is in an on-hook condition.

22. A variable voice compression ratio device comprising:

a memory adapted and arranged by a user to contain a plurality of voice compression ratio values each associated with respective call related information;

a call related information receiver to receive call related information provided by a central office of a telephone company with respect to an incoming call;

a processor to determine a current usage of voice message memory and, upon said current usage reaching a pre-determined level, to compress voice messages stored in said voice message memory based on a compression ratio value determined by a comparison of said received call related information with said respective call related information contained in said memory.

* * * * *